United States Patent [19]

Piazza

[11] Patent Number: 5,847,279
[45] Date of Patent: Dec. 8, 1998

[54] ANGULAR SPEED MEASURING DEVICE

[75] Inventor: Silvio Dalla Piazza, St-Imier, Switzerland

[73] Assignee: Asulab S.A.

[21] Appl. No.: 670,414

[22] Filed: Jun. 26, 1996

[30] Foreign Application Priority Data

Jun. 29, 1995 [FR] France .................................. 95 07847

[51] Int. Cl.⁶ .................................................. G01P 9/04
[52] U.S. Cl. ..................... 73/504.16; 73/504.12
[58] Field of Search ........................... 73/504.16, 504.12, 73/504.13, 504.14, 504.15

[56] References Cited

U.S. PATENT DOCUMENTS

| | | | |
|---|---|---|---|
| 3,258,617 | 6/1966 | Hart | 310/9.8 |
| 4,671,112 | 6/1987 | Kimura et al. | 73/505 |
| 5,251,483 | 10/1993 | Soderkvist | 73/504.16 |
| 5,287,745 | 2/1994 | Dalla-Piazza | 73/505 |
| 5,329,816 | 7/1994 | Soderkvist et al. | 73/505 |
| 5,420,548 | 5/1995 | Nakajima | 73/504.16 |
| 5,481,914 | 1/1996 | Ward | 73/504.16 |
| 5,668,317 | 9/1997 | Farine | 73/504.16 |

FOREIGN PATENT DOCUMENTS

| | | |
|---|---|---|
| 0 161 049 | 11/1985 | European Pat. Off. . |
| 0 494 588 | 7/1992 | European Pat. Off. . |
| 0 578 519 | 1/1994 | European Pat. Off. . |

*Primary Examiner*—Christine K. Oda
*Attorney, Agent, or Firm*—Griffin, Butler, Whisenhunt & Szipl, LLP

[57] ABSTRACT

An angular speed measuring device comprises a rotating tuning fork transducer. First excitation electrodes excite the transducer to cause a first vibration in a first plane parallel to the planes of the principal faces of the transducer. The first vibration induces a second vibration in a plane perpendicular to the planes of the principal faces. The second vibration comprises a first component having an amplitude representative of the angular speed, and a second or parasite component. To avoid the distorting effects of the parasitic component of the second vibrations, the device is provided with a second set of excitation electrodes to excite a third vibration in the transducer, the third vibration being in phase opposition to the parasite component of the second vibration. Detection electrodes are provided for detecting vibrations in the direction perpendicular to the principal faces. The output signal produced by the detection electrodes is utilized control the second set of excitation electrodes to slave the amplitude of the third vibration to the amplitude of the parasite component of the second vibration.

3 Claims, 2 Drawing Sheets

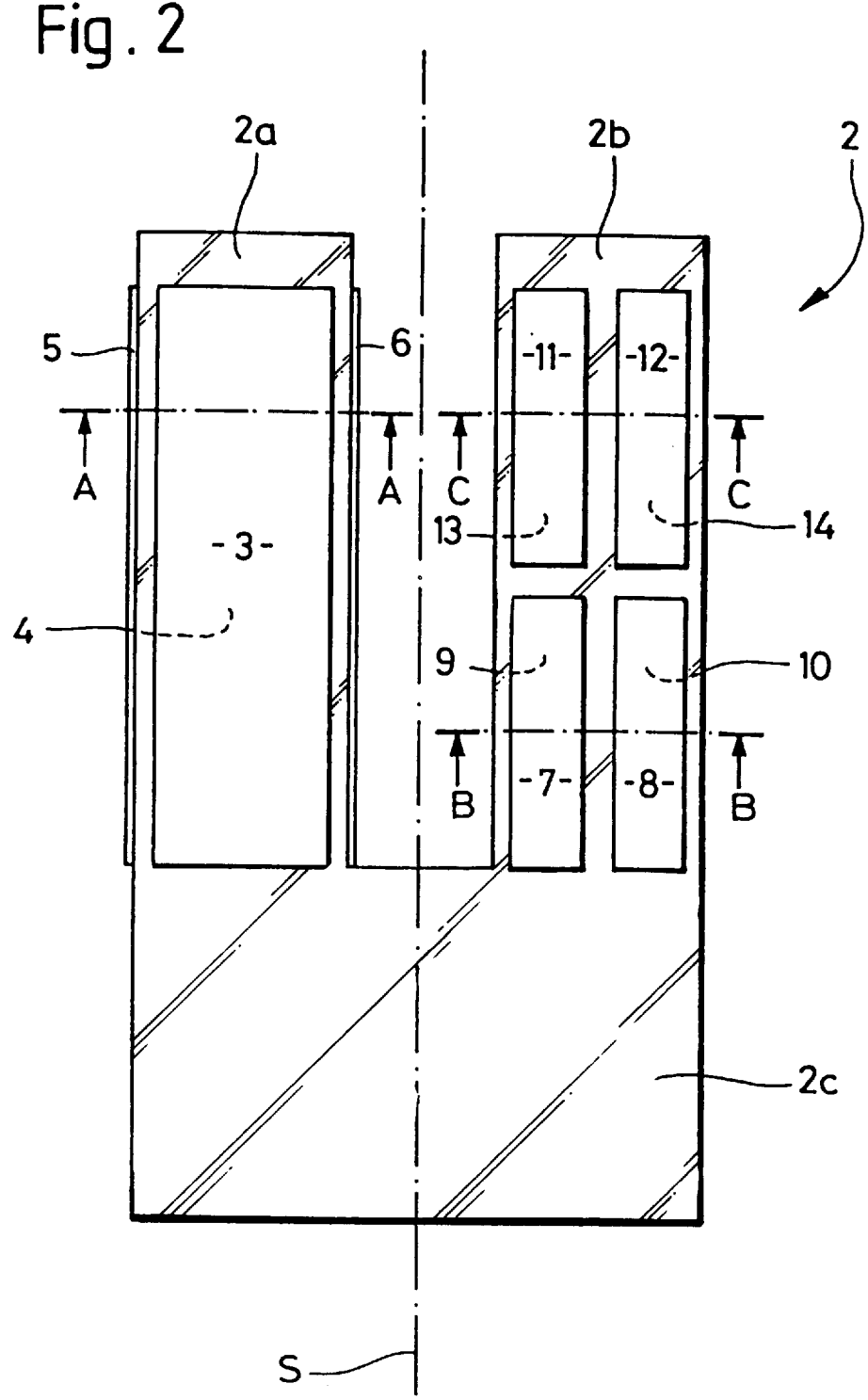

ANGULAR SPEED MEASURING DEVICE

FIELD OF THE INVENTION

The present invention relates to an angular speed measuring device of the type wherein excitation of a first vibration in one arm of a tuning fork causes a second vibration in a second arm, the second vibration having a useful component and a parasitic component. More particularly, the invention provides a second excitation means for exciting a third vibration in the second arm, the third vibration being in phase opposition to the parasitic component of the second vibration so that the detection signal produced by the device comprises only the useful component of the second vibration.

BACKGROUND OF THE INVENTION

An angular speed measuring device of the prior art comprises a piezoelectric transducer intended to rotate at said angular speed; first excitation means for exciting a first vibration of said transducer at a fixed frequency and in a first direction, and a measuring means for producing a measurement signal of said angular speed in response to a second vibration of said transducer, said second vibration being caused by said first vibration and having said fixed frequency and being in a second direction perpendicular to said first direction and comprising a useful component, the amplitude of which is representative of said angular speed, and a parasite component, the amplitude of which is independent of said angular speed.

The excitation means of said first vibration of the transducer of a device such as defined hereabove comprises, in a well-known manner, excitation electrodes arranged on this transducer and an electronic circuit connected to these electrodes and arranged in such a way so as to apply to them an excitation signal of this first vibration.

Furthermore, the measuring means of such a device comprise detection electrodes arranged on the transducer in such a way so as to produce a detection signal in response to the second vibration of this transducer. These measuring means further comprise an electronic circuit which responds to the detection signal for producing a measurement signal which is representative of the angular speed of the transducer.

It is well-known that the second vibration of the transducer of an angular speed measuring device comprises a useful component, the amplitude of which is representative of the angular speed of this transducer, as well as a parasite component, the amplitude of which does not depend on the angular speed of the transducer.

The detection signal mentioned hereabove comprises thus also a useful component and a parasite component which are respectively representative of the amplitude of the useful component and that of the parasite component of this second vibration.

In known devices such as described in the patent U.S. Pat. No. 4,671,112, the detection signal is applied to an electronic mixer after having been amplified by a decoupling amplifier. The excitation signal of the transducer is also applied to this mixing circuit, also after having been amplified by a decoupling amplifier.

The signal produced by this mixer is then applied to a low-pass filter the output of which produces a continuous signal which is the measurement signal of the angular speed of the transducer. But this signal, apart from the fact if it comprises a first component representative of the useful component of the detection signal provided by the transducer and thus of the angular speed of this latter, further comprises a second component which is representative of the parasite component of this detection signal.

It is, however, well-known that the amplitude of the useful component of the second vibration of the transducer of an angular speed measuring device may be very small, especially when this angular speed of this transducer is low and that, in such a case, the amplitude of the parasite component of this second vibration is much greater than that of this useful component.

The same is obviously also true for the useful and the parasite components of the detection signal produced by the detection electrodes of the second vibration of the transducer.

Thus, for example, while the transducer of an angular speed measuring device is constituted by a quartz tuning fork, as is the case in many devices of this kind, the useful component of the detection signal has an amplitude which is around one tenth of a millivolt, or at most, several tenths of millivolts, while the angular speed of the tuning fork is around several degrees per second, whereas the parasite component of this detection signal is several tenths, or even several hundreds millivolts.

It results from this that the value of the first component of the signal provided by the filter of a device such as that which is described in the patent U.S. Pat. No. 4,671,112 mentioned hereabove is very small, and that the value of the second component of this signal is much larger than that of this first component when the angular speed of the transducer is low.

The sensitivity of such a measuring device is thus low.

It is to be noted that this sensitivity cannot be increased by increasing the gain of the decoupling amplifier, mentioned hereabove, which amplifies the detection signal before it is applied to the mixing circuit, because this amplifier amplifies in the same way both components of this detection signal.

Furthermore, the gain of this amplifier must of course be inferior to that at which its output saturises. The amplifier of the parasite component of the detection signal being relatively high as is shown hereabove, this gain cannot be other than relatively low. As a result, even after having been amplified by this amplifier, the useful component of the detection signal has a small amplitude when the angular speed of the transducer is low.

It is also well-known that the amplitude of the parasite component of the second vibration of the transducer varies as a function of the temperature of the latter while the amplitude of the useful component of this second vibration is practically independent of this temperature. The signal provided by a device such as described in the patent U.S. Pat. No. 4,671,112 is thus also variable as a function of the temperature.

It is also well-known that the parasite component of the second vibration of the transducer is substantially in phase with the first vibration of this transducer, while the useful component of the second vibration is substantially in phase-quadrature with this first vibration.

The parasite and useful component of the detection signal are thus also respectively in phase and in quadrature with the excitation signal of the first vibration of the transducer.

It would thus be possible to replace, in a device such as described in the patent U.S. Pat. No. 4,671,112, the mixing circuit by a phase-quadraturing demodulation circuit, which is a well-known circuit and the output of which provides a signal which is representative of the component of a signal applied to its input which is in phase-quadrature with the reference signal.

Thanks to this modification of this device, the signal which it would provide would thus only be representative of the useful component of the detection signal.

But, as already mentioned, this useful component has an amplitude which is very small when the angular speed of the transducer is low. The same will be true for the signal provided by such a modified device, and it would be necessary to strongly amplify this signal if this device were intended to measure these low angular speeds. The amplifier which would be needed in such a case would be difficult to manufacture, and would be thus rather expensive, because the signal that it would have to amplify is a continuous signal of a small value so that the specifications of this amplifier would have to be very stable as a function of the temperature.

Several solutions have been proposed to solve this problem posed by the small sensitivity and by this instability as a function of the temperature.

Thus, for example, the patent U.S. Pat. No. 5,287,745 describes an angular speed measuring device the output signal of which is obtained by measuring the phase-shift between the excitation signal of the first vibration of its transducer and the detection signal of the second vibration of this latter. Furthermore, the sensitivity of this device is increased, in one of its embodiments, thanks to the fact that it comprises a memory in which is stored the value of the phase-shift mentioned hereabove when the angular speed of the transducer is zero, this value obviously being representative of the amplitude of the parasite component of the detection signal. This device further comprises a circuit which subtracts permanently this memorised value from the measured value, so that the signal provided by this latter circuit only depends on the amplitude of the useful component of the detection signal.

This device is relatively complex because it must use a highly stable time base for measuring the phase-shift mentioned hereabove. Furthermore, it produces a measurement signal which is digital. However, devices to which a measurement signal of the angular speed is to be provided are often devices of an analog nature. In such cases, the device described by the patent U.S. Pat. No. 5,287,745 hereabove must be completed by a digital-analog converter, which is a relatively complex circuit and the temperature-stability of which cannot be guaranteed without further increasing its complexity.

The patent U.S. Pat. No. 5,329,816 describes an angular speed measuring device the transducer of which has the shape of a tuning fork having two arms which are joined together by a base.

This transducer comprises six electrodes which are isolated one from the other and which are arranged on a first arm of the tuning fork thereby forming two distinct groups of excitation electrodes of its first vibration.

A group of detection electrodes is arranged on the second arm of the tuning fork in such a way so as to produce the detection signal which is representative of the angular speed of the transducer in response to the second vibration of the transducer.

Furthermore, a group of electrodes, so-called feedback electrodes, are also arranged on the second arm of the tuning fork in such a way so as to produce a feedback signal in response to the first vibration of the transducer.

The electronic circuit of the device described by this patent U.S. Pat. No. 5,329,816 comprises a classic demodulating circuit and a classic low-pass filter for providing the measurement signal of the angular speed of the transducer in response to the detection signal and to the feedback signal mentioned hereabove.

This device further comprises a second demodulating circuit which also receives the detection and the feedback signals and which provides a control signal to a controlled oscillator having two outputs which are each connected to one of the groups of excitation electrodes of the transducer.

The constitution and the functioning of this controlled oscillator are not described in this document, only several succinct explications being given relative to the desired effect which should be obtained thanks to the separation of the excitation electrodes into distinct groups and to the presence of feedback electrodes. However, the specialists may deduct from these explications that the oscillator should provide different excitation signals to the two groups of excitation electrodes of the transducer, the difference between these signals depending on the feedback signal, thereby aiming to modify the first vibration of the transducer in such a way that it comprises a component which counterbalances the parasite component of the second vibration of this transducer. But it cannot be seen how this aim can be obtained, because the feedback signal which acts on the oscillator is produced in response to the first vibration of the transducer and is thus independent of the second vibration of this transducer.

In any case, the controlled oscillator which is necessary in this device is relatively complicated to manufacture, and thus relatively expensive, due to the fact that it must provide two different signals, at least one of which being variable. Furthermore, the transducer used in this device is also relatively complex, and thus relatively expensive, due to the fact that it must comprise two groups of excitation electrodes of its first vibration.

SUMMARY OF THE INVENTION

An object of the present invention is to propose an angular speed measuring device which can have a sensitivity which is much greater than that of known devices and which provides a measurement signal which is practically independent of the temperature, thereby using a transducer and an electronic circuit which are relatively simple and thus of low cost.

This object is achieved by the device according to the present invention which is an angular speed measuring device comprising:

a piezoelectric transducer intended to rotate at said angular speed;

first excitation means for exciting a first vibration of said transducer at a fixed frequency and in a first direction;

measuring means for producing a measurement signal of said angular speed in response to a second vibration of said transducer, said second vibration being caused by said first vibration and having said fixed frequency and being in a second direction which is perpendicular to said first direction and comprising a useful component, the amplitude of which is representative of said angular speed, and a parasite component, the amplitude of which is independent of said angular speed;

and which is characterized by the fact that it further comprises:

second excitation means for exciting a third vibration of said transducer at said fixed frequency, in said second direction and in phase-opposition with respect to said parasite component of said second vibration, and slave means for slaving the amplitude of said third vibration to the amplitude of said parasite component of said second vibration.

As will be described in more detail hereafter, these features have as a consequence that the detection signal produced by the detection electrodes of the transducer of this device are formed only by the useful component and do not comprise any parasite component. It is thus possible to increase the sensitivity of this device by simply increasing the gain of the decoupling amplifier which applies this detection signal to a demodulating circuit. Further, this detection signal is independent of the temperature of the transducer, this being also true for the measurement signal provided by the device.

BRIEF DESCRIPTION OF THE DRAWINGS

Other objects and advantages of the present invention will become apparent from the following description of an embodiment which will be made with reference to the accompanied drawings in which:

FIG. 2 is a schematic view of a transducer which may be used in the device of FIG. 1.

DESCRIPTION OF PREFERRED EMBODIMENT

Figure 1:
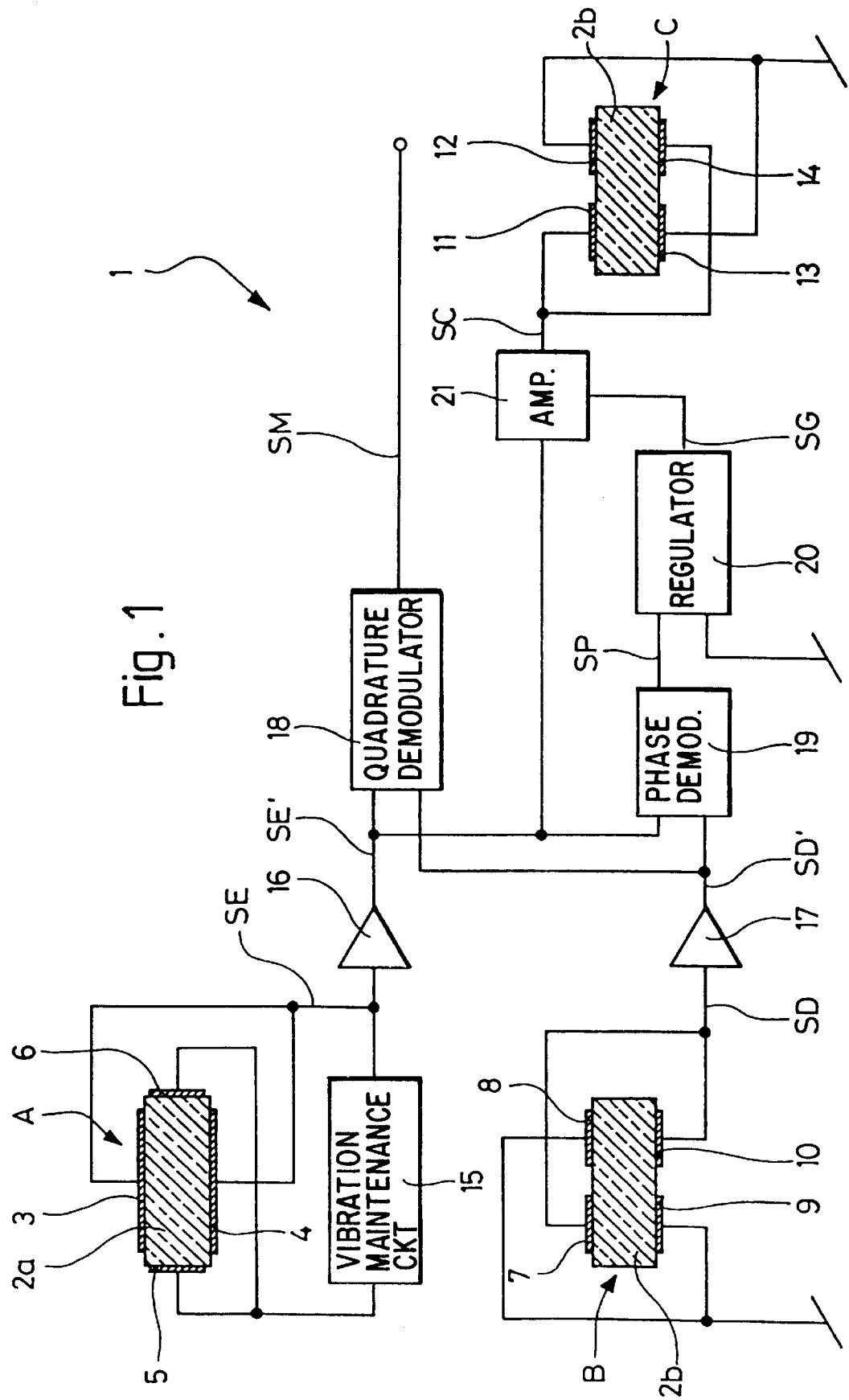
FIG. 1 is a block diagram of this embodiment of an angular speed measuring device.

In the embodiment which is represented by way of a non-limitative example in FIG. 1, the angular speed measuring device according to the present invention, which is designated by general reference 1, comprises a transducer formed of a tuning fork 2 having two arms 2a and 2b joined together by a common base 2c (see FIG. 2).

In this example, the tuning fork 2 has been cut out, in a known manner, in a quartz plate the faces of which being substantially perpendicular to the optical axis Z of the quartz, and the direction of the length of its branches 2a and 2b being substantially parallel to the mechanical axis Y of the quartz. The angles formed by the faces of the quartz plate and the axis Z of this latter, and by the direction of the length of the branches 2a and 2b and the axis Y of the quartz are determined, respectively, in a known manner, by the features which the tuning fork 2 should have.

In a classical manner, tuning fork 2 comprises excitation electrodes of a first vibration of its arms 2a and 2b which are formed by two electrodes 3 and 4 arranged opposite to each other on either principal face of the branch 2a, and by two electrodes 5 and 6 which are also arranged opposite to each other each on the lateral faces of this same arm 2a. Conducting paths, non represented, connect, on the one hand, the electrodes 3 and 4 to each other and to a connection terminal situated on the base 2c of tuning fork 2 and, on the other hand, the electrodes 5 and 6 to each other and to another connection terminal also situated on base 2c, these two connection terminals are also not represented.

The skilled person will easily understand that the electrodes 3 to 6 described herebefore are intended to excite a flexion vibration of arms 2a and 2b of tuning fork 2 in a first direction parallel to the plane of the principal faces and at a frequency which is essentially fixed by their dimensions. It is this flexion vibration of these arms 2a and 2b which forms the first vibration of tuning fork 2.

It is well-known that this first vibration of tuning fork 2 creates a second vibration of the latter, which is also a flexion vibration of arms 2a and 2b, but in a direction which is perpendicular to the planes of the principal faces, i.e. which is perpendicular to the direction of the first vibration, and that this second vibration has the same frequency as the first.

This second vibration comprises a first component which is caused by the Coriolis forces which act on arms 2a and 2b when these vibrate according to the first vibration defined hereabove and when tuning fork 2 rotates around its sensitivity axis designated by reference S in FIG. 2. The amplitude of this first component is thus representative of the angular speed of tuning fork 2 around sensitivity axis S, and this first component is the useful component of the second vibration of this tuning fork 2.

It is also well-known that the second vibration of tuning fork 2 further comprises a second component, which is only caused by the anisotropy of the mechanical features of the quartz and the amplitude of which is independent of the angular speed of tuning fork 2 but which varies, on the contrary, as a function of the temperature. This second component is generally called the parasite component of the second vibration.

In device 1 of FIG. 1, tuning fork 2 further vibrates according to a third vibration which is excited in a manner which will be shown further on. It will be simply mentioned here that this third vibration is also a flexion vibration of the arms 2a and 2b of tuning fork 2 in a direction which is also perpendicular to the planes of the principal faces, and which is thus the same as that of the second vibration mentioned hereabove. Furthermore, this third vibration has the same frequency as the first and as the second vibration.

Tuning fork 2 further comprises two electrodes 7 and 8 arranged next to each other on one of the principal faces of branch 2b and occupying about the first half of the length of this arm, and two electrodes 9 and 10 arranged on the other principal face of branch 2b opposite electrodes 7 and 8 respectively. Conducting paths, non-represented, connect, on the one hand, electrode 7 and 10 to each other and to a connection terminal arranged on base 2c of tuning fork 2, and, on the other hand, electrodes 8 and 9 to each other and to another connection terminal also arranged on base 2c. These two connection terminals are also not represented.

The skilled person will readily understand that electrodes 7 to 10 described here-above are detection electrodes intended to produce a signal in response to any flexion of branch 2b in a direction perpendicular to the planes of its principal faces.

In the present case, these electrodes 7 to 10 are thus intended to produce a signal, which will be called the detection signal SD, in response to the superposition of the second and third vibration of tuning fork 2 which have been described hereabove.

Tuning fork 2 further comprises four electrodes 11, 12, 13 and 14 which are also arranged on arm 2b, and which extend respectively along the extension of the detection electrodes 7, 8, 9 and 10 and occupy about the second half of the length of this arm 2b. Conduction paths, non-represented, connect, on the one hand, electrodes 11 and 14 to each other and to a connection terminal situated on the base 2c of tuning fork 2 and, on the other hand, the electrodes 12 and 13 to each other and to another connection terminal also situated on base 2c, these two connection terminals also not being represented.

These electrodes 11 to 14 are intended to excite the third vibration of tuning fork 2 mentioned hereabove, in such a way as will be explained more precisely hereafter.

References A, B and C indicated in FIG. 1 respectively designate a schematic cut of branch 2a and of electrodes 3 to 6 made along the plane A—A of FIG. 2, a schematic cut of branch 2b and of electrodes 7 to 10 made along the plane B—B of FIG. 2, and a schematic cut of branch 2b and of electrodes 11 and 14 made along the plane C—C in FIG. 2.

FIG. 1 shows specifically that angular speed measuring device 1 according to the present invention comprises, in a classical manner, a maintenance circuit of the first vibration of tuning fork 2, which is designated by reference 15, the input and the output of which are connected respectively to electrodes 5 and 6 and to electrodes 3 and 4.

This maintenance circuit 15 will not be described in detail because it may be realized in several ways well known to the skilled person.

The signal SE applied by the output of the maintenance circuit 15 to electrodes 3 and 4 will be called the excitation signal of the first vibration of tuning fork 2. This signal SE obviously has the same frequency as the first vibration of tuning fork 2.

It can further be seen in FIG. 1 that electrodes 8 and 9 form part of the detection electrodes described hereabove and are connected to the mass of device 1, that is to that of the terminals of the voltage supply source, not represented, which supplies this device 1, the voltage of which is chosen arbitrarily as the reference voltage. The detection signal SD mentioned hereabove is thus that one which is provided by the two other detection electrodes 7 and 10.

As already mentioned before, this signal SD is produced in response to the superposition of the second and the third vibration of tuning fork 2 and thus has the same frequency as these vibrations. It further comprises three components which are respectively representative of the useful component of the second vibration, of the parasite component of the second vibration, and of the third vibration. These three components of signal SD, which have the same frequency as the latter, and thus as the signal SE, will be called in an analog manner the useful component, the parasite component, and the third component of this signal SD.

It will be shown in more detail further on that the third vibration of tuning fork 2 is in phase-opposition with the parasite component of the second vibration. The same is thus also true for the parasite component and the third component of signal SD. To simplify the following description, the combination of these two last components will be called the combined component of signal SD.

It is well-known that the useful component of detection signal SD is substantially in phase-quadrature with the excitation signal SE of the first vibration, i.e. the phase-difference between this useful component and this signal SE is substantially equal to ±90°, the signum of this phase difference depending on the disposition and the connection of electrodes 3 to 6 and 7 to 10 and, for a given position and connection, on the sense of rotation of tuning fork 2 around its sensitivity axis S.

Moreover, it is well-known that the parasite component of the detection signal SD is substantially in phase or in phase-opposition with the excitation signal SE, again according to the disposition and the connection of electrodes 3 to 6 and 7 to 10.

In the rest of this description which will follow, it will be assumed that these electrodes 3 to 6 and 7 to 10 are arranged and connected in such a way that the parasite component of the signal SD is in phase with the signal SE.

It results from this that the combined component of signal SD which was defined hereabove is in phase with this signal SE if the amplitude of the parasite component of this signal SD is larger than that of the third component of the signal SD, and is in phase-opposition with this signal SE in the opposite case.

Excitation signal SE of the first vibration of the tuning fork applied by circuit 15 to electrodes 3 and 4 is also applied to the input of a decoupling amplifier 16 the output of which provides a signal SE' which is proportional to this excitation signal SE and which is in phase with this signal SE.

Also, the detection signal SD is applied to a decoupling amplifier 17 the output of which provides a signal SD' which is proportional to this detection signal SD and which is in phase with this detection signal SD. This signal SD' obviously comprises a useful component and a combined component which are proportional respectively to the useful component and the combined component of signal SD and which are respectively in phase with these latter components.

Still in a known manner, signals SE' and SD' are applied to the inputs of a phase-quadratured demodulating circuit 18 the output of which forms the output of device 1 and provides the measurement signal SM of the angular speed of tuning fork 2.

Circuit 18 will not be described in detail here because it may be obtained in several ways well-known to skilled persons. It will be simply mentioned that a phase-quadratured demodulating circuit is a circuit having an output which provides a continuous signal having a value which is representative of the amplitude of the component of the input signal which is in phase-quadrature with the reference signal, the signum of this continuous signal depending on the signum of the phase difference between these two signals.

In the present example, the reference signal is signal SE', the input signal is signal SD', and the component of this input signal which is in phase-quadrature with the reference signal is the useful component of this signal SD'. Signal SM provided by circuit 18 and its signum are thus, respectively, representative of the amplitude of this useful component of signal SD' and of the signum of the phase difference between this useful component and signal SE'. This signal SM is thus also representative of the angular speed of tuning fork 2 around its sensitivity axis S and of the direction of this angular speed.

Signal SE' and SD' are also applied to inputs of a phase demodulating circuit 19, the output of which provides a signal SP.

This circuit 19 will not be described in more detailed here because it also is a circuit well-known to the skilled person.

It will be simply mentioned here that the phase demodulating circuit is a circuit the output of which provides a continuous signal having a value which is representative of the amplitude of the component of an input signal which is in phase or in phase-opposition with a reference signal, this continuous signal being positive or negative depending on whether this component is for example, in phase or in phase-opposition with this reference signal. In the present example, the reference signal is the signal SE', the input signal is the signal SD' and the component of this input signal which is in phase or in phase-opposition with this reference signal is the combined component of the signal SD'. The value of this signal SP is thus representative of the amplitude of this combined component, and its signum is positive or negative according to this combined component being in phase or being in phase-opposition with the signal SE'.

Signal SP produced by circuit 19 is applied to a first input of a regulating circuit 20 having a second input connected to the mass and an output providing a signal SG which has a constant value when signal SP has a value zero, and which increases or diminishes respectively when the signal SP is positive or is negative.

The circuit 20 will not be described in more detail here either, because it may be obtained in several ways well-known to the skilled person. It will be simply mentioned here that such a regulating circuit generally comprises a comparing circuit for comparing two signals applied to its inputs, and an integrating circuit of the signal produced by its comparing circuit, as well as several components intended to provide the desired features and the ensure the stability of its functioning.

Device 1 further comprises an amplifier 21, the input of which receives the signal SE' provided by amplifier 16 and the output of which is connected to electrodes 11 and 14 arranged on arm 2b of tuning fork 2, and the gain of which is variable in function of the value of signal SG which is applied to a control input.

Electrodes 12 and 13 are also arranged on arm 2b of tuning fork 2 and are connected to the mass of device 1.

Signal SE' applied to the input of amplifier 21 is obviously an alternating signal having the same frequency as the first vibration of tuning fork 2. The signal SC applied to electrodes 11 and 14 is thus also alternating, and its frequency is also equal to that of the first vibration of tuning fork 2.

As may be readily understood, this signal SC excites a vibration of arm 2b and thus also of arm 2a of tuning fork 2. The arrangement of electrodes 11 to 14 has as a consequence that this vibration is a flexion vibration of branches 2a and 2b of tuning fork 2 in a direction perpendicular to the planes of the principal faces of the tuning fork.

Furthermore, these electrodes 11 to 14 are connected to the amplifier 21 which is arranged in such a manner that this third vibration is in phase-opposition with the second vibration of tuning fork 2.

It is thus this vibration produced in response to signal SC applied by amplifier 21 which is the third vibration of tuning fork 2 mentioned hereabove.

When device 1 functions, the maintenance circuit 15 excites the first vibration of tuning fork 2 and thus indirectly the second vibration of this tuning fork.

The demodulating circuit 18 thus produces, in a known manner, the measurement signal SM of the angular speed of tuning fork 2 in response to signals SE' and SD'.

The functioning of the rest of device 1 will now be described thereby assuming that, firstly, the signal SG which controls the gain of amplifier 21 has exactly the value for which the amplitude of signal SC is such that the third vibration of tuning fork 2 has an amplitude equal to that of the parasite component of the second vibration of the tuning fork. This third vibration and this parasite component being in phase-opposition as explained hereabove, the combined component of signal SD and that of signal SD' thus have an amplitude which is equal to zero. Signal SP thus has a value zero, so that the signal SG does not vary and maintains its value mentioned hereabove.

The loop formed by tuning fork 2, electrodes 7 to 10, amplifier 17, demodulator 19, regulating circuit 20, amplifier 21 and electrodes 11 to 14 is thus in a stable state.

If now the amplitude of the parasite component of the second vibration of tuning fork 2 increases for some reason, for example following a variation of the temperature of this tuning fork 2, the amplitude of the combined components of the signals SD and SD' which were zero, increase, at least for a first moment. Furthermore, these combined components are thus in phase with signal SE and SE'.

It results from this that the value of signal SP, which was zero, becomes positive. The value of signal SG thus starts to increase, as is the case for the amplitude of signal SC and thus the amplitude of the third vibration of tuning fork 2.

This increase of the amplitude of this third vibration causes a decrease of that of the combined components of signal SD and SD' and thus a decrease of the value of signal SP.

As long as signal SP stays positive, the value of signal SG continues to increase, as well as the amplitude of signal SC and of the third vibration of tuning fork 2.

But when this amplitude of the third vibration becomes equal to that of the parasite component of the second vibration of the tuning fork 2, the amplitudes of the combined components of signal SD and SD' become again zero, as is the case for the value of signal SP. Signal SG stops to increase and the loop defined hereabove will find itself again in the new stable state.

It may readily be seen that an analog process will occur if the amplitude of the parasite component of the second vibration of tuning fork 2 decreases for some reason. In such a case, the amplitude of the combined components of signal SD and SD' also increases, but the combined components are thus in phase-opposition with the signals SE and SE'.

The value of signal SP thus become negative, so that the value of signal SG decreases, which causes a decrease of the amplitude of signal SC and thus, of the third vibration of tuning fork 2.

When this amplitude of this third vibration become equal to that of the parasite component of the second vibration of tuning fork 2, the loop defined hereabove will again reach a stable state.

It can thus be seen that this loop defined hereabove slaves the amplitude of the third vibration to the amplitude of the parasite component of the second vibration of the tuning fork 2 independent of the amplitude of the parasite component and of its variations or the cause of these variations.

It can further be seen that this slaving has as effect that the combined components of signals SD and SD' always have an amplitude zero except during the time that it is necessary that the process described hereabove occurs.

But, if the features of the different circuits forming this slave loop, and in particular the features of the regulating circuit 20, are chosen carefully, which is within the capacity of the skilled person, this time which is necessary for the occuring of the process described hereabove may be rendered very short, also because the variations of the amplitude of the parasite component of the second vibration of tuning fork 2 are never very fast.

It can be seen that the amplitude of the combined component of signals SD and SD' is practically always zero and that these signals are thus practically only formed by their useful components.

These two signals SD and SD' are thus practically independent of the amplitude of the parasite component of the second vibration of tuning fork 2 and of the variation of this parasite component, which represents very important advantages of the device according to the present invention with respect to known devices.

Thus, it may readily be seen that it is simple to increase the sensitivity of the measuring device according to the invention when this device is intended to measure low angular speeds. In such a case it suffices to provide amplifier 17 with a gain which is sufficiently high for the useful component of signal SD', which is practically the only component of this signal, to have such an amplitude which allows the measurement signal SM to be used directly without requiring amplification by a direct current amplifier which is itself rather difficult to realize.

It may also be seen that these advantages of the device according to the present invention are independent of any variation of the features of the different circuits forming the feedback-loop mentioned hereabove. The functioning of such a device is thus much more stable than the functioning of known devices.

Furthermore, all of the circuits used in the device according to the present invention are well-known and relatively simple. Also, the transducer of such a device is very simple to manufacture, and thus much cheaper, than that of the device described in the patent U.S. Pat. No. 5,329,816 due to the fact that this device only comprises one single set of excitation electrodes of its first vibration.

Concerning this, it may be noted that the fabrication of the tuning fork 2 used in device 1 described hereabove may be further simplified by manufacturing the electrodes 8 and 12 on the one hand, and 9 and 13 on the other hand, from one single piece, because in this example, these four electrodes are connected to the mass of device 1. This simplification further allows to remove one of the two connection terminals which are connected to these electrodes in this example.

Several modifications may further be applied to this device described herebefore, without departing as such from the scope of the invention.

Thus, for example, the several electrodes of tuning fork 2 may be arranged in such a way that the direction of its first vibration is perpendicular to the plane of its principal faces and that the direction of its second and its third vibrations are parallel to these planes.

Also, these different electrodes may be arranged on arms 2a and 2b of the tuning fork in a manner which is different from the one described hereabove. For example, the excitation electrodes of the first vibration and the excitation electrodes of the third vibration may be arranged on one of these arms, while the detection electrodes of the second and the third vibration may then be arranged on the other of these arms.

Also by way of example, tuning fork 2 which is used as the transducer in device 1 described hereabove may be replaced by any other usable transducer in such a device.

What is claimed is:

1. An angular speed measuring device comprising:

a piezoelectric transducer rotatable at an angular speed;

first excitation means for exciting a first vibration of said transducer at a fixed frequency and in a first direction;

measuring means for producing a measurement signal of said angular speed in response to a second vibration of said transducer, said second vibration being a reaction to said first vibration and having said fixed frequency and being in a second direction perpendicular to said first direction and comprising a useful component having an amplitude which is representative of said angular speed and a parasite component having an amplitude which is independent of said angular speed, wherein the device further comprises:

second excitation means for exciting a third vibration of said transducer at said fixed frequency, in said second direction and in phase opposition with said parasite component of said second vibration; and slave means for slaving an amplitude of said third vibration to the amplitude of said parasite component of said second vibration.

2. An angular speed measuring device comprising:

a piezoelectric transducer rotatable at an angular speed;

first excitation means for exciting a first vibration of said transducer at a fixed frequency and in a first direction, wherein said first excitation means comprise first excitation electrodes arranged on said transducer, and a maintenance circuit coupled to said first electrodes for providing a first excitation signal;

measuring means for producing a measurement signal of said angular speed in response to a second vibration of said transducer, said second vibration being a reaction to said first vibration and having said fixed frequency and being in a second direction perpendicular to said first direction and comprising a useful component having an amplitude which is representative of said angular speed, and a parasite component having an amplitude which is independent of said angular speed, said measuring means comprising detection electrodes arranged on said transducer for producing a detection signal in response to said second vibration and to said third vibration, said detection signal having a useful component representative of said useful component of said second vibration, and a combined component representative of a combination of said third vibration with said parasite component of said second vibration, and means responsive to said useful component of said detection signal and to said first excitation signal for producing said measurement signal;

wherein the device further comprises:

second excitation means for exciting a third vibration of said transducer at said fixed frequency, in said second direction and in phase opposition with said parasite component of said second vibration, said second excitation means comprising second excitation electrodes and a variable gain amplifier circuit responsive to said first excitation signal and to a control signal for providing to said second excitation electrodes a second excitation signal; and slave means for slaving an amplitude of said third vibration to the amplitude of said parasite component of said second vibration, said slave means comprising means responsive to said first excitation signal and to said detection signal for producing a measurement signal of said combined component of said detection signal, and regulation means responsive to said measurement signal of said combined component for providing said control signal with a value which is such that said third vibration has an amplitude which is equal to the amplitude of said parasite component of said second vibration and that said measurement signal of said combined component has a value which is equal to zero.

3. A device according to claim 2, wherein said transducer is formed by a quartz tuning fork having a first and a second arm linked together by a base, the quartz tuning fork having principal faces substantially perpendicular to an optical axis of said quartz tuning fork and a length of said arms extending substantially in a direction of a mechanical axis of said quartz tuning fork;

said first excitation electrodes comprising two electrodes arranged one opposite the other on each of said principal faces of said first arm and being electrically connected to each other, and two electrodes arranged one opposite the other on each lateral face of said first arm and being electrically connected to each other;

said detection electrodes comprising a first and a second electrode arranged next to each other on one of the principal faces of said second arm and extending substantially along a first half of the length of said second arm, and a third and a fourth electrode arranged on the other of the principal faces of said second arm opposite respectively said first and said second electrode, said first and fourth electrodes being electrically connected one to the other and said second and third electrodes being electrically connected one to each other; and said second excitation electrodes comprising a fifth, a sixth, a seventh, and an eighth electrode respectively arranged in an extension of said first, of said second, of said third, and of said fourth electrode and extending substantially along a second half of said length of said second arm, said fifth and eighth electrodes being electrically connected one to the other and said sixth and seventh electrodes being electrically connected one to the other.

* * * * *